United States Patent
Masuda et al.

(10) Patent No.: US 7,405,737 B2
(45) Date of Patent: Jul. 29, 2008

(54) METHOD FOR SPECIFYING PAINT COLOR FROM COMPUTER GRAPHICS PICTURE

(75) Inventors: Yutaka Masuda, Fujisawa (JP);
Tsukasa Fujieda, Yokohama (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 71 days.

(21) Appl. No.: 10/996,370

(22) Filed: Nov. 26, 2004

(65) Prior Publication Data

US 2005/0110797 A1     May 26, 2005

(30) Foreign Application Priority Data

Nov. 26, 2003   (JP)   ............... 2003-395873

(51) Int. Cl.
*G09G 5/02* (2006.01)
(52) U.S. Cl. ............. 345/593; 345/594; 345/589; 382/164; 382/165
(58) Field of Classification Search .......... None
See application file for complete search history.

(56) References Cited

U.S. PATENT DOCUMENTS 6,720,971 B1 * 4/2004 Yamamoto et al. ........ 345/581

2001/0036309 A1 * 11/2001 Hirayama et al. ........... 382/167
2002/0063721 A1 * 5/2002 Masuda et al. .............. 345/600

FOREIGN PATENT DOCUMENTS

| JP | 7-121558 | 5/1995 |
| JP | 11-269411 | 10/1999 |

* cited by examiner

*Primary Examiner*—Kee M. Tung
*Assistant Examiner*—Kevin K Xu
(74) *Attorney, Agent, or Firm*—Wenderoth, Lind & Ponack, L.L.P.

(57) ABSTRACT

A paint color is specified from a computer graphics picture by displaying a computer graphics picture suitable for the impression of a desired paint color on a display unit, obtaining color information on displayed colors in two or more designated regions on the displayed picture, and searching and selecting a paint color having color information approximate to the color information on the display colors from a database previously storing color information on a plurality of paint colors.

4 Claims, 4 Drawing Sheets

| name | dRGB25 | dRGB45 | dRGB75 | dRGB3deg | cs image |
|---|---|---|---|---|---|
| H199M054 | 15.7 | 35.3 | 41.7 | 30.9 |  |
| H900M020 | 22.9 | 37.1 | 44.2 | 34.7 |  |
| H899M041 | 32.2 | 34.0 | 41.4 | 35.8 |  |
| H200M011 | 18.1 | 44.3 | 50.1 | 37.5 |  |
| H197R025 | 28.3 | 43.6 | 53.0 | 41.7 |  |
| H900R012 | 17.1 | 52.2 | 64.6 | 44.6 |  |
| H199M004 | 51.9 | 37.6 | 49.6 | 46.4 |  |

METHOD FOR SPECIFYING PAINT COLOR FROM COMPUTER GRAPHICS PICTURE

FIELD OF THE INVENTION

The present invention relates to a method for specifying a paint color from a computer graphics picture suitable for the impression of a desired paint color.

BACKGROUND OF THE INVENTION

In recent years, product appeal (product power) has been further requested for industrial products, particularly for automobiles. The product appeal is a quality of appearance and the design image of a paint color lies in the quality.

In the process of an automobile design, a designer of an automobile decides the paint color, and then it is necessary to accurately communicate the design image of a paint color along the concept of the type of an automobile designed by the designer to a designer of the paint maker for manufacturing paints.

When a paint color is a solid color having no directional property, a designer of an automobile can accurately communicate the design image of a paint color to a paint maker by using various color sample books in common. However, because a metallic color which changes color depending on the viewing angle is not included in color sample books, a designer of an automobile may use an image picture as a communication tool. The image picture shows the image of a paint color as one picture along the concept of the type of an automobile to which a designer of an automobile applies a paint color.

Figure 2:
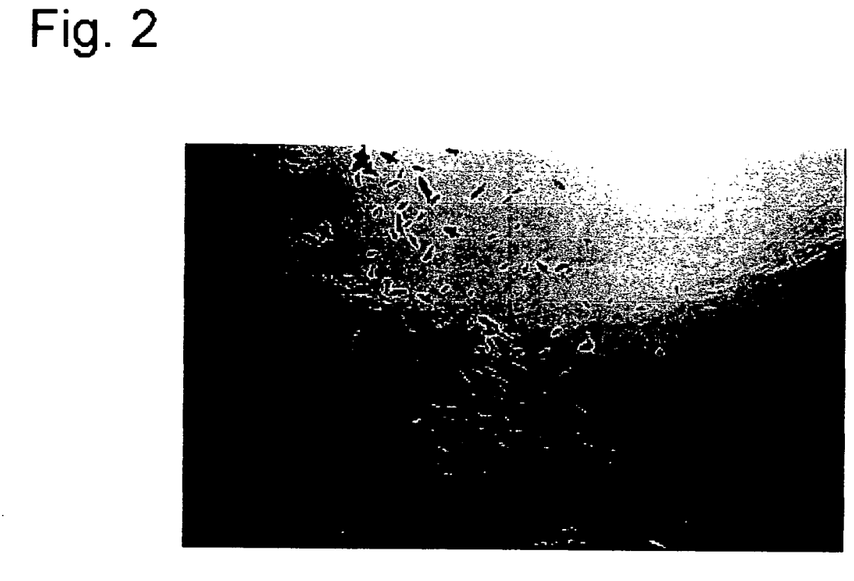
FIG. 2 is an underwater photo which is a halftone picture displayed on a display.

A specific example of the image picture is the underwater photo shown in FIG. 2. This photograph, which looksup at the sea surface from the seabed, expresses a change of colors from the blue of redness with low brightness up to the blue of yellowness with a high brightness. To embody these images as paint colors, a designer at a paint company designs a paint color in accordance with their experience and know-how.

Thus, various pictures are used as image pictures. However, to develop a paint color by understanding images obtained as paint colors from those pictures, a designer must search a color stored in the designer's brain which was experienced in the past out of colors in a specified plurality of regions in the pictures in accordance with their highlight and shade colors. This search requires years of experience and craftsmanship in order to understand a picture of a designer of an automobile and prepare the paint color having a color tone the same as the picture.

As a case of searching a color from RGB values of a point specified in a digital picture, Japanese Patent Application Publication No. 121558/1995 discloses a technique for obtaining RGB values from a specific point in a display means for displaying a picture, searching a data holding means and simply obtaining the name of the color. However, a method for searching a color changes with the viewing angle.

Moreover, Japanese Patent Application Publication No. 269411/1999 discloses a technique in which RGB values from a computer graphics picture are acquired and converted into tri-stimulus value, an approximated color is searched from the database with which the tri-stimulus value of a plurality of paint formulations is stored, and a technique of asking for paint formulation by CCM is indicated. However, this technique requires previous measurement and calculation in order to convert RGB values into XYZ of a color measurement value. Therefore, it is necessary to previously prepare color characteristics of the device used (digital camera, scanner, and monitor) (they are referred to as color profiles) and an immense amount of time is required. Moreover, when a reflectance exceeds 100% (white solid), such as a high-brightness and high-chroma metallic paint color, the brightness (value Y of XYZ or $L^*$ of $L^*a^*b^*$) exceeds 100. However, in the case of the digital gradation of a monitor that is generally used, values to be taken for each channel of RGB values are integers of 0 to 255. Therefore, a dynamic range is very narrow compared to the brightness of a color measurement value. Therefore, to estimate a high-brightness high-chroma metallic paint color having a wide dynamic range from RGB values having a narrow dynamic range, a desired paint color may not be obtained because a large error occurs.

The following two Japanese documents are representative of the background of the present invention:

(1) "*Tanoshiku manabu JAVA di hajimeru gazo shori programming*" (Picture processing programming started with merrily learning JAVA) by Mikio Sugiyama, issued by Kabushiki Kaisha D ART, Dec. 20, 2002, pp. 144-150; and (2) "*Shin JAVA gengo nyumon/Senior hen*" (New Java language guide/senior edition) by Haruhiko Hayashi, issued by SOFTBANK Publishing Inc., Mar. 20, 2002, pp. 542-543.

It is an object of the present invention to provide a method for specifying a paint color of an industrial product, particularly a metallic paint color having a high design characteristic from a digital image picture for showing the quality sense of a color exhibited by a customer.

SUMMARY OF THE INVENTION

The present invention relates to:

1. A method for specifying a paint color from a computer graphics picture, characterized by displaying a computer graphics picture suitable for the impression of a desired paint color on a display device, obtaining color information on displayed colors in two or more designated regions on the displayed picture, and searching and selecting a paint color having the color information approximate to the color information on the displayed color from a database previously storing color informations on a plurality of paint colors.

2. A method for specifying a paint color from the computer graphics picture described in the above Item 1, characterized by styling a computer graphics picture through photo-mosaic processing, averaging color informations every specified area, and then designating a region.

3. A method for specifying a paint color described in the above Item 1, characterized in that the color information obtained from a region designated in a computer graphics picture is RGB values.

4. A method for specifying a paint color from the computer graphics picture described in the above Item 1, characterized in that a desired paint color is a metallic paint color which colors changes with the angle to see and luminance levels of two or more regions designated from a computer graphics picture are different from each other.

5. A method for specifying the paint color described in the above Item 4, characterized in that color informations on paint colors previously stored in a database are RGB values calculated in accordance with a spectral reflectance measured in accordance with a multiangle condition.

6. A method for specifying the paint color described in the above Item 1, characterized in that a computer display for displaying a computer graphics picture suitable for the impression of a desired paint color is a display device which can discriminate 32,000 or more colors.

The present invention makes it possible to search a paint color suitable for an image from an image picture exhibited by a customer and prepare a paint color in accordance with the search result.

DETAILED DESCRIPTION OF THE INVENTION

Figure 1:
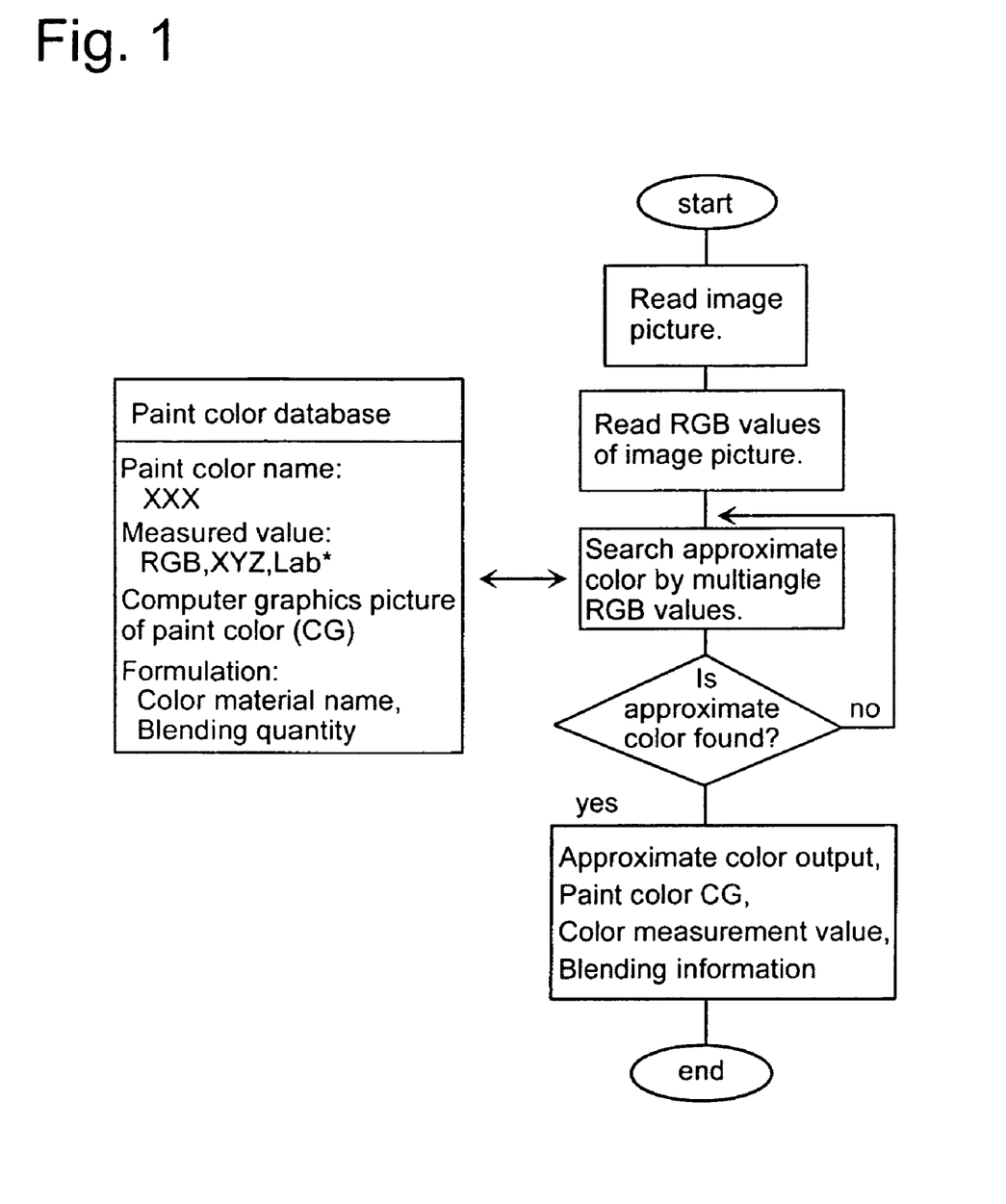
FIG. 1 is a flowchart showing steps of the present invention.

A method for specifying a paint color from a computer graphics picture by the present invention is described by referring to the accompanying drawings. FIG. 1 is a flowchart showing steps of the present invention.

Step 1 in FIG. 1 is a step of displaying a computer graphic picture. Specifically, step 1 is a step which uses a device, such as an image scanner, downloads to a computer the image picture which expressed the image of a paint color presented by a customer as a picture of one sheet, and displays it on a computer display. The computer graphics picture is not restricted. It may use a brushwork, a photo, printed matter, a picture whose color is modified after being downloaded into a computer, or a picture photographed by a digital camera. When obtaining an image picture from a customer as electronic data, it is possible to directly display the data on a computer display.

To store pictures, it is possible to use raster images such as a TIFF image, bitmap image, JPEG image, GIF image, and PNG image which are generally widely used.

Moreover, it is enough that color information such as RGB values can be acquired from an optional region in the picture independently of an image format. Therefore, it is also possible to use a PICT image which is a vector image, EPS image (Encapsulated PostScript), SVG image, and PDF image.

Furthermore, when using commercial application software, though the image format depends on application software, it is possible to use the application software as long as it can read color information on RGB values.

It is preferable to use a computer display which can discriminate 32,000 or more colors as a display for displaying a computer graphics picture. When a picture display which can discriminate 32,000 or more colors is used, the picture can be visually seen as a natural picture even if the number of colors of an image picture is reduced. However, 32,000 colors or more are necessary. Especially the display that can discriminate 16700000 colors, generally called full color, is desirable, and when processing a natural picture, the display capability of the gradation of a color (the gradual and progressive change from one color or tone to another) is excellent.

Step 2 in FIG. 1 is a step of acquiring the color information on display colors in two or more designated regions, i.e., ROI (regions of interest), on a displayed computer graphics picture.

As a specific example of color information read from a computer graphics picture, RGB values are used. The RGB values are one type of color models obtained by digitalizing color information, which shows colors by red, green, and blue. The RGB values are used for a scanner, display, digital camera, and color television. A reproduced color is shown by three values of RGB and it is possible to designate various colors by changing these values. A display shows colors by changing R, G, and B signals in accordance with the above method.

Step 2 in the present invention is a step of designating two or more regions of different luminance and obtaining the color information of each region. When the number of regions to be designated is two, step 2 serves as a step of acquiring the color information on the designated regions by using a region having higher luminance as a region corresponding to the highlight angle of a paint color and a region having lower luminance as a region corresponding to the shade angle of the paint color. When the number of regions to be designated is three, step 2 serves as a step of obtaining the color information on the designated regions by using a region whose luminance is in the middle among three regions as a region corresponding to the face angle of the paint color.

That is, when designating a region (1) corresponding to the highlight angle of a paint color and a region (2) corresponding to the shade angle of the paint color, it is preferable that the luminance of the region (1) is higher than the luminance of the region (2). Moreover, when designating three regions including a region corresponding to the face angle of the paint color which is a middle angle between highlight and shade, it is preferable that the luminance of this region shows an intermediate value between the luminance of the region (1) and the luminance of the region (2).

Furthermore, when the color information to be acquired is RGB values and two regions such as the region (1) corresponding to the highlight angle of a paint color and the region (2) corresponding to the highlight angle of the paint color are designated, it is preferable that the maximum value of RGB values of the region (1) is larger than the maximum value of RGB values of the region (2). When designating three regions including a region corresponding to the face angle which is an intermediate angle between highlight and shade, it is preferable that the maximum value of RGB values of this region shows an intermediate value between the maximum value of RGB values of the region (1) and the maximum value of RGB values of the region (2).

To acquire RGB values of a designated region from a computer graphics picture, it is possible to use an image editing program which is generally widely used. An acquiring method depends on an image format. Basically, the purpose can be attained when three signal intensity, R, G, and B, reads and displays the signal level stored for the digital data of 0-255 about the certain pixel point in a picture, the size of a picture shown by longitudinal and transverse dimensions.

To acquire and display RGB values of a designated region, it is possible to use two methods. One of them is a method using the color information obtaining method shown in Color class of JAVA language described in "*Shin JAVA gengo nyumon/Senior hen*" (New Java language guide/senior edition) by Haruhiko Hayashi, issued by SOFTBANK Publishing Inc., Mar. 20, 2002, pp. 542-543. Specifically, when assuming positional coordinates of a region from which RGB values are read as (x,y), int getRed (x,y) is used out of a JAVA language program in order to obtain the value of R. Then, it is possible to obtain the decimal number of R in the returned value of the method. Similarly, getGreen (x,y) is used for the G value and getBlue (x,y) is used for the B value.

The second method is a method using commercial software. For example, it is possible to read R, G, and B values at an optional position on a picture and display the values on a screen by using the information pallet described at page 6 of Users' Guide of Japanese version of Photoshop™ 6.0 of Adobe Systems Incorporated (U.S.A.) used for the photo retouch (photo edition) of an image picture.

It is possible to read numerical values of RGB values by decimal notation of 0-255 or hexadecimal notation of 00-FF. When RGB values of a paint color stored in a color library to be described later are shown by decimal notation, it is preferable to read the color information on a specific region through decimal notation. It is possible to mathematically mutually convert notations.

Moreover, when the color depth of a picture and a computer display to be used is 8 bits, R value, G value, and B value range between 0 and 255. However, when using a computer display having a color depth of 8 bits or more, such as 12 or 16 bits, the range differs. For example, in the case of 12 bits, R, G, and B values range between 0 and 4,095. In this case, it is necessary to measure a paint color and convert tri-stimulus values into RGB values by 12 bits in a step of preparing a database to be described later.

The RGB values in a specific region on a computer graphics picture can be read by the above-mentioned method.

In this case, the RGB values at a pixel on the computer graphics picture will be read. Then, it may be more efficient to equalize RBG values for every division of arbitrary size depending on a picture, and to read the RGB values.

As a computer graphics picture, when using the photograph of a blue sky, and the photograph of a 3-dimensional object, the shade and a gradation portion are in a computer graphics picture. Although it is possible to read RGB values at every pixel in these cases, and it specifies, RGB values change with the delicate positions frequently. In such a case, photo-mosaic processing which is a general technique of image processing can be performed beforehand so as to arrange the picture in a tile-like configuration.

This photo-mosaic processing is processing which equalizes RGB values in P×P (this is called tile) to the specified pixel value. If the value of P is specified suitably, although the reality nature of a picture will be lost, since RGB values can be read actively conversely, a region can be specified and the process which obtains RGB values can be performed easily.

Though the method of photo-mosaic processing is not restricted, photo-mosaic processing can be executed by the method shown below. Specifically, when using the Japanese version of Photoshop™ 6.0 of Adobe Systems Incorporated (U.S.A.), it is possible to use a function of filter processing (pixelate) and details are described in on-line help (photo-mosaic processing of pixelate filter). As another method, the mosaic picture forming method can be used which is described in "*Tanoshiku manabu JAVA de hajimeru gazo shori programming*" (Picture processing programming started with merrily learning JAVA) by Mikio Sugiyama, issued by Kabushiki Kaisha D ART, Dec. 20, 2002, p. 182. The fact that color information can be easily confirmed by dividing it into what size of a tile depends on the size of the "pattern" of an object of an image picture.

That is, when the pattern is small, it is preferable to use a small tile. When the pattern is large, it is preferable to bring color information into mosaic by a large tile. As a result of performing experiments by using various image pictures, a tile having one side of 10 to 100 pixels is preferable as the size of a tile in the case of a picture of 640×480 to 1,200×1,000 pixels. However, the size of a tile is not restricted.

Step 3 in FIG. 1 is a step of searching a paint color suitable for RGB values of a plurality of regions obtained in step 2 from a previously prepared database.

A database (color library) can be prepared in accordance with the following method. Paint colors developed and stored by a paint company every year are measured by a multi-angle colorimeter and values obtained by converting tri-stimulus values XYZ and L*a*b* into RGB values and computer graphics images of paint colors prepared from color measurement values and names of paint color are stored as a color library. This method is already common.

It is possible to convert color measurement values XYZ into RGB values in accordance with the following method.

RGB values can be calculated by using a determinant from XYZ values obtained by measuring luminance of R, G, B, and WHITE of a computer display by a spectral radiant luminance meter. The emission luminance depends on a color temperature setting of the computer display.

Moreover, to more accurately calculate the RGB values, it is necessary to obtain a function of emission luminance to R, G, and B input voltages of the computer display (this is referred to as γ function) and correct the function. Conversion from XYZ values into RGB values can be calculated from a measured value obtained by directly measuring the characteristic of a monitor used.

Furthermore, it is also possible for a computer display to convert NTSC color format used for broadcast and reception of television signals into RGB values by using the conversion formula announced by CIE (the International Commission on Illumination). In this case, the NTSC color format denotes a type of a color picture, which defines a color by a luminance signal Y and two chromatic signals B-Y and R-Y.

Search using a color library can be made by a method for inputting the color information on the specific region obtained in step 2 to a color library and searching an approximate color.

When color information is RGB values, to obtain approximate values of RGB values, it is possible to use the calculation method of the Euclidean metric between RGB values of a specific region designated in a computer graphics picture and RGB values of a paint color.

For example, the distance between the RGB values of the specific region in the computer graphics picture and the RGB values of the paint color is $\Delta RGB = sqrt(\Delta R^2 + \Delta G^2 + \Delta B^2)$ when assuming RGB values as Ri, Gi, Bi (i=image) and Rm, Gm, Bm (m=measure). In this case, $\Delta R = Ri - Rm$, $\Delta G = Gi - Gm$, and $\Delta B = Bi - Bm$ are shown. The distance $\Delta RGB$ is hereafter referred to as "RGB color difference".

Moreover, when comparing RGB values obtained by designating two or more regions from which luminosity differs from a computer graphics picture with multiangle RGB values of a paint color, it is possible to use the average value of RGB color differences.

For example, when designating three regions out of a computer graphics picture for comparison with color information on three angles of a paint color, the following is used: the average value of the RGB color difference between a region having the highest luminance out of regions designated from a computer graphic picture and the highlight angle of a paint color, the RGB color difference between a region having an intermediate luminance out of the regions and the face region of the paint color, and the RGB color difference between a region having the lowest luminance out of the regions and the shade region of the paint color. This average value can be obtained from the following equation.

$$\Delta RGB = (Kh \times \Delta RGBh + Kf \times \Delta RGBf + Ks \times \Delta RGBs)/3$$

In the above equation, $\Delta RGBh$ shows the RGB color difference between a region having the highest luminance out of regions designated from a computer graphics picture and the highlight angle of a paint color, ΔRGBf shows the RGB color difference between a region having an intermediate luminance out of the regions designated from the computer graphics picture and the face angle of the paint color, and ΔRGBs shows the RGB color difference between a region having the lowest luminance out of the regions designated from the computer graphics picture and the shade angle of the paint color.

Moreover, Kh, Kf, and Ks respectively show a weighted coefficient of a RGB color difference in each angle. It is possible to designate an optional value between 0.8 and 1.2 to these coefficients. When setting all coefficients to 1.0, this represents that the coefficients are not weighted and multi-angle RGB color differences are equally calculated.

In a step of searching a paint color, to weight highlight and search a color at the highlight portion of a picture which is preferentially suitable, it is possible to set Kh to a value equal to or more than 1.0. In general, it is preferable to set all coefficients to 1.0 and equally calculate multiangle RGB color differences.

A search result is evaluated in the following step.

In the case of the present invention, a search result obtained in the previous step is displayed on a computer display as the name of a paint color. A search result is not restricted to one paint color but it is preferable to display a plurality of paint colors by arranging the paint colors so as to start with a paint color having the smallest RGB color difference and end with a paint color having the largest RGB color difference. Moreover, it is possible to display not only the name of a paint color but also the color measurement value, RGB values, RGB color difference, and computer graphic of the paint color and the formulation (type and quantity of color material) preparing the paint color.

In the case of the evaluation of a search result, because a color having a small RGB color difference is calorimetrically a paint color closest to an image picture, it is possible to select the color as a paint color. However, when using a metallic paint color whose color depends on a viewing angle, a designer who searches a paint color by using the present invention method can decide a paint color to be preferentially evaluated from a search result.

That is, the designer can grasp the image of the whole paint color from the computer graphic of a paint color listed as a prospective one in accordance with the sensibility of the designer, examine absolute values of brightness and luminance of highlight in accordance with a color measurement value, take the hiding power and price of a paint color into account from formulation, and finally decide a paint color to be adopted.

A color measurement value generally has a dynamic range wider than the range (0-255) of RGB. That is, in the case of the screen of a computer display, a range from black having RGB values (0, 0, 0) up to white having RGB values (255, 255, 255) is the dynamic range. However, when a paint color is white, the reflectance at a highlight angle is approx. 100%. However, when the paint color is a silver metallic color, it is displayed as white on a screen though the reflectance at the highlight angle is approx. 400%. Therefore, the difference of brightness or luminance due to the difference of quality sense of a paint color whose determination is difficult by only RGB values can be decided by referring to the color measurement value of each paint color.

EXAMPLES

Next the present invention is more specifically described by using examples.

(Preparation for Color Database)

1. Preparation for Stock Colors

Stock colors are paint colors developed and stored every year by a paint company for top coating of automobiles and 3,876 colors are used this time. In the case of the breakdown of paint colors, the number of solid colors is 328, the number of white pearl colors is 675, and the number of metallic colors is 2,873. A method for preparing stock colors is described below.

(1) A cation electrodeposition paint (ELEECRON™ 9400HB made by Kansai Paint Co., Ltd.) is applied to a steel plate (JIS G3141) which is degreased and treated by zinc phosphate as a curing paint film so that the film thickness becomes 20 μm.

(2) An undercoat paint (LUGA-BAKE™ undercoat GRAY made by Kansai Paint Co., Ltd.) is applied to the color card obtained in the above Item (1) as a curing paint film so that the thickness becomes 30 μm.

(3) A top coat paint is applied to the color card obtained in the above Item (2) by coating systems of a solid color (1C1B), metallic color (2C1B), and white pearl color (3C1B) to prepare colors.

The top coat paint is a paint including various color materials (color pigment and effective pigment) by using acrylic resin containing hydroxyl group and butylated melamine resin as basic resins. 1C1B denotes a paint system to be applied to a solid color, which is obtained by baking and curing a top coat paint containing the above basic resins and a coloring pigment on an undercoat paint film as indispensable components. 2C1B denotes a painting system to be applied to a general metallic color, which is obtained by applying a base pigment containing the above basic resins, color pigment, effective pigment as indispensable components onto an undercoat paint film, moreover applying a clear paint onto the undercoat paint film, and then baking and curing them. 3C1B denotes a painting system to be applied to a white pearl color or the like, which is obtained by applying a coloring base paint containing the above basic resins and color pigment as indispensable components onto an undercoat paint film, applying a pearl base paint containing a effective pigment as an indispensable component onto the undercoat paint film, and moreover applying a clear paint onto the undercoat paint film, and then baking and curing it.

The clear paint uses the LUGA-BAKE™ CLEAR (acrylic resin/amino resin system and organic solvent type) made by Kansai Paint Co., Ltd. The paint film thickness of each paint is set in ranges of the base paint (15-20 μm and clear paint (25-40 μm).

These stock colors are paint colors covering the commercial color area of an automobile top coat. Among these stock colors, a color obtained by mixing 3-coat white pearl color and 2C1B metallic color is referred to as a metallic color.

2. Color Measurement

For the stock colors prepared in the above Item 1, spectral reflectances at five angles of 15°, 25°, 45°, 75°, and 110° are color-measured by the portable multi-angle spectrophotometer (MA68™ made by X-Rite Inc., U.S.A.) to calculate XYZ, L*a*b*, and L*c*h* when observing conditions are D65 and 10° visual field by the method disclosed in Japanese Patent Publication (Laid-open) No. 10045/1998.

3. Calculation of Value

XYZ obtained in the above Item 2 is converted into RGB values by using the following equation 1.

$$\begin{bmatrix} R \\ G \\ B \end{bmatrix} = \begin{bmatrix} 1.69149 & -0.63025 & 0.02358 \\ -3.18189 & 4.56361 & 0.09552 \\ -0.65440 & 0.06430 & 0.69920 \end{bmatrix} \begin{bmatrix} X \\ Y \\ Z \end{bmatrix} \quad \text{equation 1}$$

Moreover, a color temperature is set to 6500K by connecting the monitor (MultiScan20se(trade name) made by Sony Corporation) to the computer (PowerMac 8100 (trade name) made by Apple Computer Inc.). XYZ values of an RGB picture displayed on a screen are measured by using the spectral radiant photometer (PR704 (trade name) made by Photo Research Inc.). In this case, because RGB values input to the monitor to display the values on a screen are already known, it is possible to obtain a γ correction function of the monitor shown below from the relation with a measured luminance.

$R: f(x)=0.004499x^2-0.149750x+0.181541$ $G: f(x)=0.004393x^2-0.108388x+0.981741$ $B: f(x)=0.004363x^2-1.086090x+0.670602$

Final RGB values are obtained by applying γ correction of the above equation to the RGB values obtained from equation 1. In this case, the range which can be taken by the RGB values is positive integers of 0 to 255. Therefore, though the reflectance at the highlight angle of a metallic color exceeds approx. 98% of a calibration white plate, RGB values become 255.

4. Preparation for Computer Graphics Picture Using Color Measurement Value

The spectral reflectance at an optional angle is estimated by using the multiple regression formula disclosed in Japanese Patent Publication (Laid-open) No. 10045/1998 from spectral reflectances of five angles measured in the above Item 2 to calculate XYZ. These values are converted into RGB values similarly to the case of the above Item 3 to prepare computer graphics pictures at angles from 15° to 75°.

5. Finishing of Database (Color Library)

Name, formulation, price, color measurement values obtained in the above Items 1 to 4, and a computer graphics picture are entered in a computer for every paint color by using the database software (FileMakerPRO4™ made by FileMaker Inc.) to obtain a data base.

(Paint Color Design Request Using Image Photo)

Paint color development is performed by assuming that a paint color development is requested and using the following two pictures from the publicly-known photo album (see a Japanese book entitled "Sozaijiten™ (subject matter dictionary)") issued by Datacraft Co., Ltd.

1. A paint color in which highlight is blue and shade is navy blue and which has a deepness feel is prepared from the underwater photo in FIG. 1.

2. An orange paint color having a color change from orange imaging flame to red and a high chroma is prepared from the flame photo in FIG. 2.

(Designation of Region and Obtainment of Color Information)

Photo-mosaic processing is applied to a square having one side of 17 pixels by using the filter function of the image editing software (Photoshop™ 6.0 made by Adobe Systems Incorporated for pictures in FIGS. 1 and 2.

Figure 3:
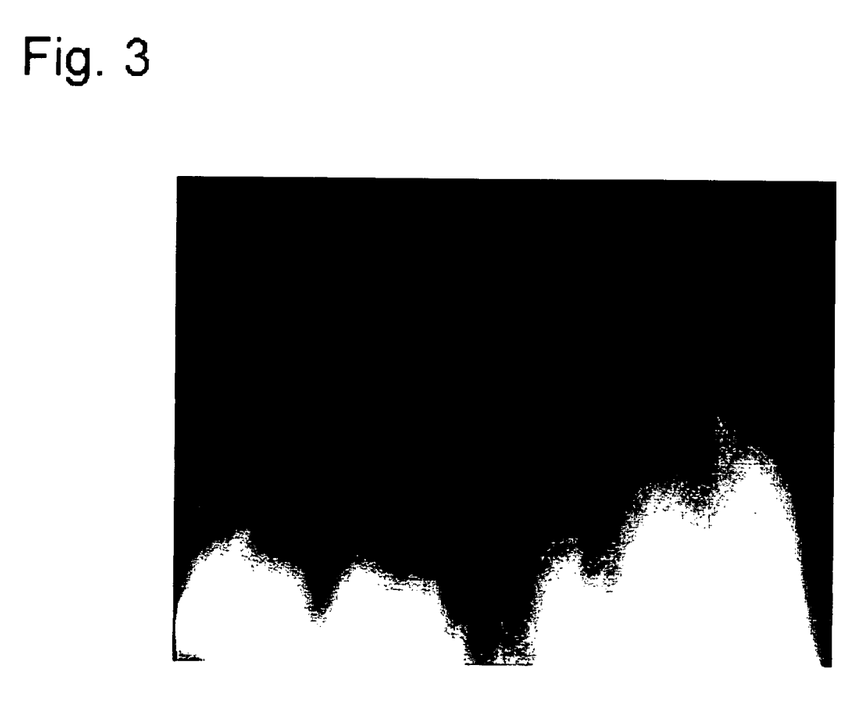
FIG. 3 is a flame photo which is a halftone picture displayed on a display.
Figure 4:
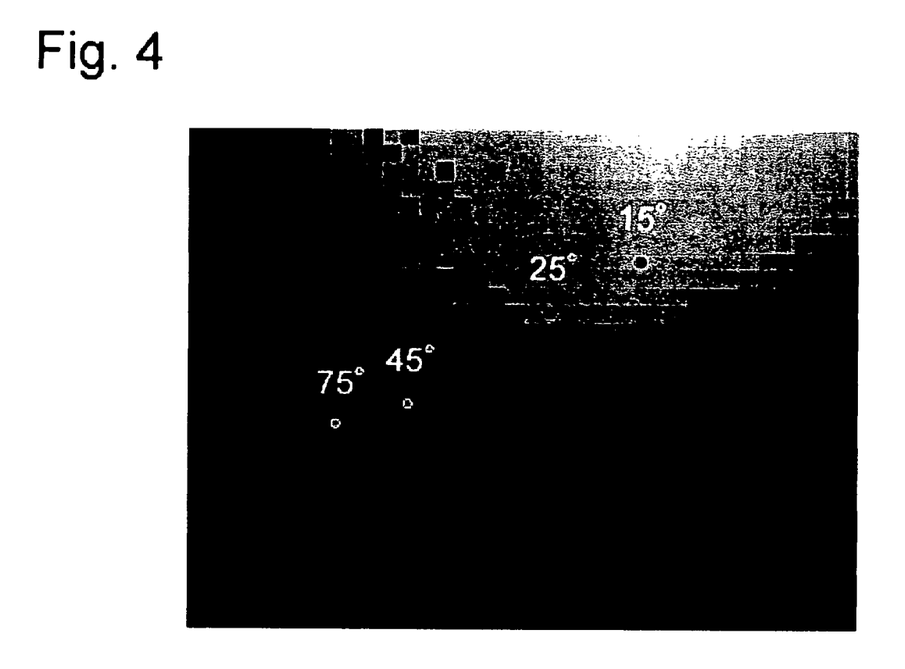
FIG. 4 is an underwater photo undergoing photo-mosaic processing, which is a halftone picture displayed on a display.

By referring to the above request, color information (RGB values) in four regions is obtained from the underwater photo to which photo-mosaic processing is applied in FIG. 3. The image editing software (Photoshop™ 6.0 made by Adobe Systems Incorporated) is used to obtain RGB values in a specific region. A mode uses a mode in which the color of a picture is not corrected. In this case, color information in regions corresponding to the following four angles are obtained. (Highlight 15°, highlight 25°, face 45°, and shade 75°)

Table 1 shows positions acquiring color information (coordinate point x,y using the top left of the photo as origin) and RGB values. From Table 1, it is found that the highlight is light blue and the shade is navy blue.

Figure 5:
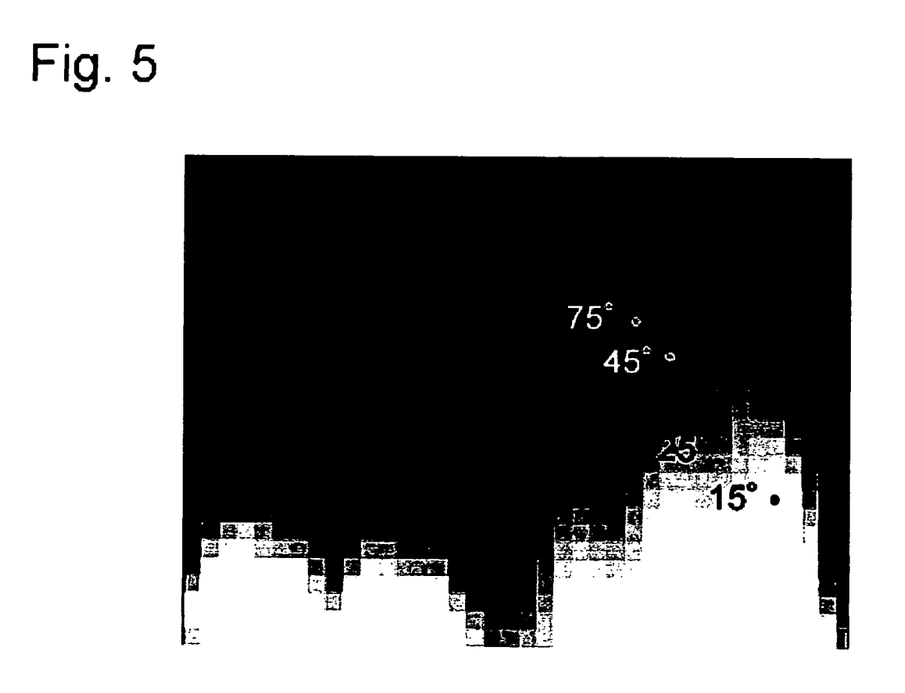
FIG. 5 is a flame photo undergoing mosaic processing, which is a halftone picture displayed on a display.

Similarly, color information in four regions corresponding to four angles is obtained from the flame photo to which the photo-mosaic processing in FIG. 5 is applied. Table 1 shows obtained color information and positions.

TABLE 1

| | Corresponding Angle | Designated region | | RGB values | | | Luminance |
|---|---|---|---|---|---|---|---|
| | | x | y | R | G | B | Σ(RGB) |
| Undersea photo | 15 | 433 | 113 | 108 | 229 | 235 | 572 |
| | 25 | 348 | 162 | 79 | 216 | 229 | 524 |
| | 45 | 212 | 248 | 19 | 112 | 191 | 322 |
| | 75 | 144 | 265 | 12 | 81 | 169 | 262 |
| Flame photo | 15 | 569 | 315 | 252 | 196 | 65 | 513 |
| | 25 | 519 | 263 | 228 | 124 | 1 | 353 |
| | 45 | 467 | 178 | 112 | 15 | 25 | 152 |
| | 75 | 433 | 145 | 44 | 17 | 18 | 79 |

(Search of Paint Color from Color Library)

Figure 6:
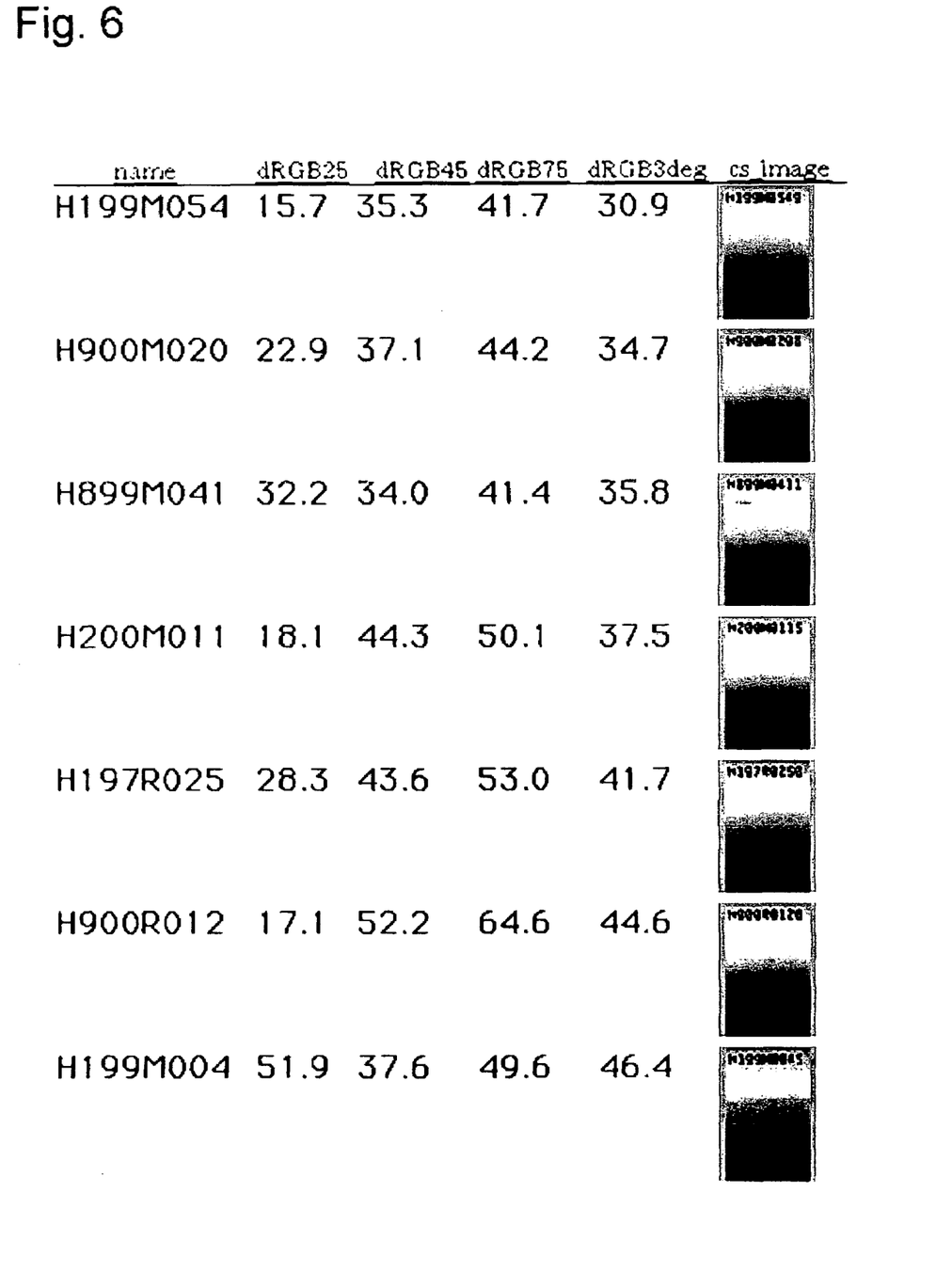
FIG. 6 is a paint-color search result which is a halftone picture displayed on a display.

Paint colors suitable for two image pictures are searched from color information acquired from the two image pictures by using a previously-prepared color library. FIG. 6 shows a result of searching a paint color in accordance with the color information acquired from the underwater photo in FIG. 2.

In FIG. 6, a paint color name, ΔRGB of each angle, and image picture of a paint color are shown from left. Moreover, ΔRGBs are shown starting with the smallest ΔRGB from the upper stage.

Example 1

A paint color is searched by using the underwater photo in FIG. 2. Color information used for the search use information acquired from two regions corresponding to highlight 25° and shade 75°. The top 10 colors obtained from the search are all metallic colors. It is determined that the metallic colors are close to a requested image and the paint color of B is selected from them. As shown in Table 4, the paint color B is a paint color having a large FF68 value of 1.4, contrast of highlight and shade, and capable of feeling a deepness feel. Because it is determined that the paint color B is considerably close to an assumed paint-color design request, the satisfaction level is O. As a result, the evaluation of O is obtained as an integrated result.

Example 2

A paint color is searched by using the underwater photo in FIG. 2 similarly to the case of Example 1. The color information used for the search are those acquired from three regions corresponding to highlight 25°, face 45°, and shade 75°. The top 10 colors obtained from the search are all metallic colors and it is determined that the colors are close to a requested image. Therefore, the paint color B is selected from the colors. As shown in Table 4, the paint color B has a large FF68 value of 1.4, contrast of highlight and shade, and capable of feeling a deepness feel. Because it is determined that the paint color B is considerably close to an assumed paint-color design request, the satisfaction level is O. As a result, the evaluation of O is obtained as an integrated result.

Example 3

A paint color is searched by using the flame photo in FIG. 3. The color information used for the search are those acquired from three regions corresponding to highlight 25°, face 45°, and shade 75°. The top 10 colors obtained through the search are all metallic colors. It is determined that the colors are close to a requested image, and therefore, the paint color C is selected from the colors. As shown in Table 4, the paint color C is an orange metallic color having a large FF68 value of 1.55, contrast of highlight and shade, and sharp image. Also in the visual evaluation, the paint color C is close to the flame image of an assumed request and the satisfaction level is O. As a result, the evaluation of O is obtained as an integrated result.

Comparative Example 1

A paint color is searched by using the flame photo in FIG. 3 similarly to the case of Example 3. Color information used for the search is that acquired from only one region corresponding to face 45°. That is, a paint color is searched which has a small ΔRGB difference of one angle of front side 45°. As a result of the search, the paint color is not obtained. Moreover, because of the search of only one angle, the searched top 10 colors are all solid colors. No color suitable for an image is obtained and an integrated evaluation is X.

Comparative Example 2

A paint color is searched by using the underwater photo in FIG. 2 similarly to the case of Example 1. A paint color is searched which has a small RGB difference dRGB of one angle of front side 45°. Color information used for the search is that obtained from only one region corresponding to face 45°. That is, a paint color is searched which has a small RGB color difference ΔRGB of one angle of front side 45°. As a result of the search, the color is one color. However, the satisfaction level of an image according to visual evaluation is A. Moreover, though this one color is a metallic color, this is a paint color having a small FF68 value (flip flop value) of 1.26 as shown in Table 4, small contrast of highlight and shade of the metallic color, and small deepness feel and the integrated determination is A.

TABLE 2

|  | Comparative Example 1 | Comparative Example 2 | Example 1 | Example 2 | Example 3 |
|---|---|---|---|---|---|
| Picture used | Picture 2 | Picture 1 | Picture 1 | Picture 1 | Picture 2 |
| Angle used | 45° | 45° | 25°, 75° | 25°, 45°, 75° | 25°, 45°, 75° |
| Search result | 0 | 1 | 10 | 10 | 10 |
| Selected color | Absent | A | B | B | C |
| Satisfaction level | Absent | Δ | O | O | O |

TABLE 2-continued

|  | Comparative Example 1 | Comparative Example 2 | Example 1 | Example 2 | Example 3 |
|---|---|---|---|---|---|
| Integrated result | X | Δ | O | O | O |

(1) Evaluation of Search Result

Evaluation of search is performed in accordance with the number of metallic paint colors included in the top 10 colors displayed starting with a color having the smallest. ΔRGB. No metallic paint color is included in the case 0 and it is denoted that only a solid color is included.

(2) Symbol of Selected Color

A designer views computer graphics pictures of the top 10 paint colors which are displayed on the screen and selects one color close to an image photo. The symbol of a selected color is the symbol of the color close to the image photo.

(3) Satisfaction Level of Selected Color

A designer visually evaluates whether the above selected one color is close to an assumed paint-color design request.

O=Considerably close

Δ=Close to a certain extent

X=Not close (4) Integrated Result

The integrated result denotes a result of combining and determining the above searches.

O=Ten selected colors are close to an assumed design request and at least one paint color is obtained out of the colors.

Δ=Though the number of colors close to an assumed design request is five or more, a satisfied paint color is not obtained from the colors.

X=A paint color close to an assumed design request is not obtained.

TABLE 3

|  | Paint color A | | | Paint color B | | | Paint color C | | |
|---|---|---|---|---|---|---|---|---|---|
| Angle | R | G | B | R | G | B | R | G | B |
| 15 | 29 | 254 | 254 | 119 | 254 | 254 | 254 | 164 | 13 |
| 25 | 29 | 224 | 254 | 65 | 215 | 236 | 242 | 118 | 13 |
| 45 | 29 | 134 | 170 | 29 | 131 | 163 | 131 | 63 | 13 |
| 75 | 29 | 79 | 106 | 29 | 96 | 134 | 79 | 41 | 13 |
| Δ45 |  | 32.0 |  |  | 35.3 |  |  | 53.0 |  |
| Δ25-75 |  | 60.9 |  |  | 44.4 |  |  | 31.1 |  |
| Δ15-45 |  | 58.5 |  |  | 34.3 |  |  | 57.1 |  |
| Δ25-45-75 |  | 51.3 |  |  | 41.4 |  |  | 38.4 |  |

Δ45 is an RGB color difference between the RGB value in a region selected as corresponding to an angle of 45° from a computer graphic picture and the RGB value of an angle of 45° color-measured for a paint color.

Δ15 is an RGV color difference corresponding to 15°, Δ25 is an RGB color difference corresponding to 25°, and Δ75 is an RGB color difference corresponding to 75°.

Δ25-75 shows the average of Δ25 and Δ75.

Δ15-45 shows the average of Δ15 and Δ45.

Δ25-45-75 shows the average of Δ15, Δ45, and Δ75.

TABLE 4

| | Paint color A | | | Paint color B | | | Paint color C | | |
|---|---|---|---|---|---|---|---|---|---|
| Angle | L* | c* | h* | L* | c* | h* | L* | c* | h* |
| 15 | 87 | 60 | 225 | 96 | 35 | 210 | 91 | 61 | 52 |
| 25 | 74 | 53 | 227 | 76 | 33 | 217 | 70 | 54 | 53 |
| 45 | 47 | 36 | 237 | 47 | 31 | 238 | 38 | 36 | 52 |
| 75 | 25 | 28 | 252 | 32 | 34 | 253 | 19 | 25 | 46 |
| 110 | 18 | 27 | 260 | 28 | 35 | 256 | 14 | 21 | 41 |
| IV68 | | 70.2 | | | 90 | | | 78.2 | |
| SV68 | | 15.9 | | | 15.9 | | | 9.8 | |
| FF68 | | 1.26 | | | 1.4 | | | 1.55 | |

The IV68, SV68 and FF68 values given in above Table 4 are those calculated from measured values of five angles color-measured by using the portable multi-angle spectrophotometer (MA68™ made by X-Rite Inc., U.S.A.).

IV68 is a Y value showing the luminance in three stimulus values XYZ of 15°.

SV68 is a Y value showing the luminance in three stimulus values XYZ of 45°.

FF68 is calculated from IV68 and SV68 by using the following equation: $FF68 = 2 \times (IV68 - SV68)/(IV68 + SV68)$

INDUSTRIAL APPLICABILITY

The present invention can be applied to paint color design of an industrial product, particularly to the coating color of an automobile.

The invention claimed is:

1. A method for specifying a first paint color, using a computer graphics picture and a color database, the method comprising:

displaying on a computer display a computer graphics picture suitable for expressing an impression of a desired paint color;

selecting at least a first region, a second region and a third region in the computer graphics picture, obtaining a color information data set of each of the first, second and third selected regions, and combining the obtained color information data sets into a combined color information data set; and searching and selecting an approximate paint color having a color information data set approximate to the combined color information data set from the color database which stores color information data sets of a plurality of previously created colors, and specifying the selected approximate paint color as the first paint color, wherein at least some of the previously created colors are metallic paint colors, each of the metallic paint colors changing in color according to differing observation angles of the respective metallic paint colors the observation angles being a shade angle, a face angle, and a highlight angle, wherein the color information data sets stored in the color database comprise color information data sets of the shade angle of the metallic paint colors, color information data sets of the face angle of the metallic paint colors, and color information data sets of the highlight angle of the metallic paint colors, wherein the computer graphics picture is composed of a plurality of colors and is divided into a plurality of areas by photo-mosaic processing, with a first one of the plurality areas of the computer graphics picture being designated as the first selected region, a second one of the plurality of areas of the computer graphics picture being designated as the second selected region, and a third one of the plurality of areas of the computer graphics picture being designated as the third selected region, wherein the designation of the first, second and third selected regions is based on luminance levels of the first, second and third selected regions, with the luminance level of the second selected region being higher than the luminance level of the first selected region and lower than the luminance level of the third selected region, wherein said searching and selecting an approximate paint color comprises:

comparing the obtained color information data set of the first selected region of the computer graphics picture to the color information data sets stored in the color database of the shade angle of the metallic paint colors;

comparing the obtained color information data set of the second selected region of the computer graphics picture to the color information data sets stored in the color database of the face angle of the metallic paint colors; and comparing the obtained color information data set of the third selected region of the computer graphics picture to the color information data sets stored in the color database of the highlight angle of the metallic paint colors, and wherein the obtained color information data sets for the first, second and third selected regions of the computer graphics picture are RGB values, and the color information data sets for the shade angle, the face angle, and the highlight angle of the metallic paint colors are RGB values.

2. The method for specifying a first paint color according to claim 1, wherein the computer display for displaying the computer graphics picture suitable for expressing the impression of the desired paint color is a display device which can discriminate 32,000 or more colors.

3. The method for specifying a first paint color according to claim 1, wherein said displaying comprises scanning an image picture and downloading the scanned image picture to a computer, and wherein the computer graphics picture displayed on the computer display is the downloaded scanned image picture.

4. The method for specifying a first paint color according to claim 1, wherein the computer graphics picture is composed of a plurality of solid colors, and wherein each of the first, second and third selected regions of the computer graphics picture corresponds to a different one of the plurality of solid colors.

* * * * *